US006242558B1

(12) United States Patent
Kelsey

(10) Patent No.: US 6,242,558 B1
(45) Date of Patent: *Jun. 5, 2001

(54) MODIFIED POLYTRIMETHYLENE TEREPHTHALATE

(75) Inventor: Donald Ross Kelsey, Fulshear, TX (US)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/756,595

(22) Filed: Nov. 27, 1996

(51) Int. Cl.$^7$ .................................................... C08G 63/06
(52) U.S. Cl. ........................ 528/206; 528/180; 528/181; 528/194; 528/195; 528/206; 528/212; 528/272; 528/279; 528/283; 528/302; 528/308; 528/308.6
(58) Field of Search ..................................... 528/180, 181, 528/194, 195, 206, 212, 272, 279, 283, 302, 308, 308.6

(56) References Cited

U.S. PATENT DOCUMENTS

| 3,386,952 | 6/1968 | Bath et al. .................... 260/45.95 |
|---|---|---|
| 3,642,868 | 2/1972 | Dexter et al. ................... 260/473 |
| 3,644,482 | 2/1972 | Dexter et al. ................... 260/473 |
| 3,676,393 | 7/1972 | Piirma ............................ 260/45.7 |
| 3,681,431 | 8/1972 | Dexter et al. ................... 260/473 |
| 3,821,169 | 6/1974 | Duddey ............................. 260/77 |
| 3,985,705 | 10/1976 | Georgoudis ..................... 260/45.8 |
| 3,987,004 | 10/1976 | Georgoudis ..................... 260/45.8 |
| 4,056,356 | 11/1977 | Gilkey et al. ....................... 8/168 |
| 4,101,326 | 7/1978 | Barkey .............................. 96/67 |
| 4,200,731 | 4/1980 | Massey et al. .................. 525/437 |
| 4,330,462 | 5/1982 | Keck et al. ...................... 524/331 |
| 4,434,276 | 2/1984 | Horlbeck et al. ................ 525/437 |
| 4,548,975 | 10/1985 | Lewis ............................. 524/147 |
| 4,910,286 | 3/1990 | White et al. .................... 528/272 |
| 5,138,024 | 8/1992 | Brozek et al. ................... 528/272 |

FOREIGN PATENT DOCUMENTS 1351247   4/1974   (GB) .

OTHER PUBLICATIONS

Weingart, F. et al., "Titanium catalyst in the manufacture of polyethylene terephthalate", *Chemical Fibers International* (CFI), vol. 46, Apr. 1996.

*Primary Examiner*—Samuel A. Acquah

(57) ABSTRACT

A 1,3-propanediol-based aromatic polyester such as polytrimethylene terephthalate is modified by reaction with a hindered phenolic acid or ester to provide an endcapped polyester which has improved resistance to generation of acrolein when heated in air.

43 Claims, No Drawings

MODIFIED POLYTRIMETHYLENE TEREPHTHALATE

BACKGROUND OF THE INVENTION

This invention relates to polytrimethylene terephthalate. In one aspect, the invention relates to the production of modified polytrimethylene terephthalate which has a reduced tendency to form acrolein when heated in air.

Polytrimethylene terephthalate is a polyester useful in fiber applications in the carpet and textile industries. The manufacture of high molecular weight polytrimethylene terephthalate commonly involves the melt condensation polymerization of 1,3-propanediol and terephthalic acid (or an alkyl ester thereof) to a low molecular weight polymer, followed by solid-state polymerization to produce a high molecular weight polyester. The 1,3-propanediol can be derived from either acrolein or ethylene oxide, but in each case the product 1,3-propanediol typically contains carbonyl-containing by-products in amounts from 50 ppm to more than 1000 ppm.

The inventor has found that when polytrimethylene terephthalate is heated in air at temperatures greater than about 100° C., such as just prior to solid-state polymerization or when the finished polymer is being dried, acrolein is slowly formed. It would be desirable to produce polytrimethylene terephthalate and other 1,3-propanediol-based polyesters having a reduced tendency to generate acrolein when heated in air.

It is therefore an object of the invention to provide a modified 1,3-propanediol-based polyester. In a specific aspect, it is an object of the invention to provide polytrimethylene terephthalate having a reduced tendency to generate acrolein when heated in air.

SUMMARY OF THE INVENTION

According to the invention, a 1,3-propanediol-based polyester composition is provided which includes polyester molecules having at least one terminal group of the formula

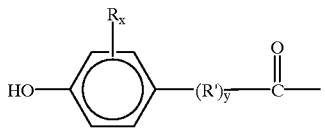

in which R is a $C_{1-12}$ alkyl group including methyl, ethyl, isopropyl, t-butyl, t-amyl, 2-phenyl-2-propyl and the like; x is an integer from 1 to 4; at least one R group is ortho to the phenolic hydroxyl group; R' is —(CH$_2$)— or alkyl-substituted methylene; and y is an integer from 1 to about 20.

Such a modified 1,3-propanediol-based polyester composition has the advantage of generating less acrolein when heated in air than the corresponding unmodified polyester.

According to a further aspect of the invention, a modified 1,3-propanediol-based polyester composition is prepared in a process comprising:

preparing a polymerization reaction mixture comprising 1,3-propanediol, an aromatic diacid or an alkyl ester thereof, and a hindered phenolic ester/acid of the formula

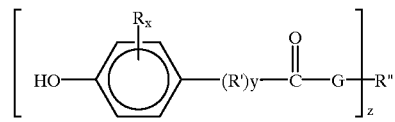

in which R is a $C_{1-12}$ alkyl group; x is an integer from 1 to 4; at least one R is ortho to the phenolic hydroxyl group; R' is —(CH$_2$)— or alkyl-substituted methylene; y is an integer from 1 to about 20; G is oxygen or nitrogen; z is an integer from 1 to about 4; and R" is a direct bond, H or $C_{1-30}$ hydrocarbyl or heterocarbyl, and maintaining said reaction product mixture at a temperature within the range of about 180 to about 300° while removing byproduct water, for a time sufficient to produce a polyester composition of intrinsic viscosity at least about 0.8.

The process produces a polyester composition which generates less acrolein when heated in air than an unmodified 1,3-propanediol-based polyester.

DETAILED DESCRIPTION OF THE INVENTION

As used herein, "1,3-propanediol-based aromatic polyester" refers to a polyester prepared by reacting at least one diol with at least one aromatic diacid (or alkyl ester thereof) in which at least 50 mole percent of the diol is 1,3-propanediol, and "polytrimethylene terephthalate" ("PTT") refers to such a polyester in which at least 50 mole percent of the aromatic diacid is terephthalic acid (or an alkyl ester thereof). Other diols may include, for example, ethylene glycol, bis(3-hydroxypropyl)ether and 1,4-butanediol, and other diacids may include, for example, isophthalic acid and 2,6-naphthalene dicarboxylic acid. The condensation polymerization of polytrimethylene terephthalate usually generates as much as about 4 mole percent of the bis(3-hydroxypropyl)ether which, in effect, becomes a comonomer and is incorporated into the polyester chain. The modified 1,3-propanediol-based polyester of the invention, including polyesters and copolyesters, is formed in part of oligomeric or polymeric chains in which the phenolic residuum of a hindered phenolic acid or ester is bonded to one or both ends of the polymer chain via an ester linkage.

Such a modified polyester can be prepared by incorporating a hindered phenolic acid or ester in a polymerization reaction mixture containing 1,3-propanediol and an aromatic diacid (or alkyl ester thereof) and permitting the polymerization reaction to proceed until a polymer of desired molecular weight is achieved. One class of such polyesters can be represented by the formulas

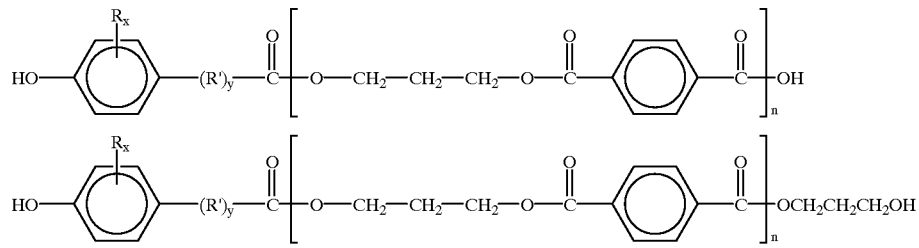

in which n is about 4 to about 2500, preferably about 40 to about 250. One specific embodiment of this class can be represented by the formula

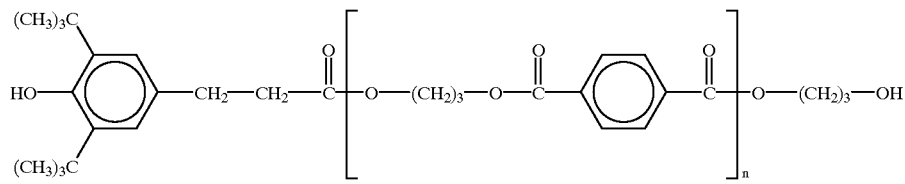

in which the polytrimethylene terephthalate composition includes polyester chains endcapped at one end with a specific hindered phenolic group.

It is not necessary that every polymer chain of the composition include a hindered phenolic group for the 1,3-propanediol-based polyester to exhibit reduced acrolein generation. On average, it is expected that advantageous results are achieved with about 0.000002 to about 2, preferably about 0.00002 to about 1.0, hindered phenolic terminal group per polymer molecule. For fiber-grade polytrimethylene terephthalate, the average number of hindered phenolic endgroups per polymer molecule will be within the range of about 0.001 to about 0.01, or about 1 out of every 100 to 1000 polymer molecules.

Numerous processes are known to prepare polyesters. Such processes may be batch or continuous and employ one or multiple stages. The currently preferred process is a two-stage condensation polymerization process which involves melt polymerization followed by solid-state polymerization. The first stage, melt polycondensation, includes two steps, a "pressure step" followed by a "vacuum step." In the pressure step, a molar excess of the diol(s) is reacted with the aromatic diacid(s) (or alkyl ester(s) thereof), usually in the absence of added catalyst in the case of diacid reactions, at a temperature within the range of about 230 to about 300° C., preferably about 240 to about 270° C., under elevated pressure, preferably under nitrogen gas, within the range of about 20 to about 200 psi, preferably about 50 psi. Water is produced as a byproduct and is removed by suitable means such as overhead distillation. The polymerization conditions are selected so as to produce a relatively low molecular weight polyester having an intrinsic viscosity (i.v.) as measured in hexafluoroisopropanol of less than about 0.3, usually within the range of about 0.05 to about 0.25.

For the vacuum step of the melt polymerization stage, the pressure is reduced and a polycondensation catalyst such as a titanium or tin compound is added. The preferred catalyst is a titanium alkoxide such as titanium butoxide typically present in an amount within the range of about 10 to about 200 ppm titanium, based on the weight of the polyester.

The low molecular weight product of the first step is heated at a temperature within the range of about 240 to about 300° C. under less than atmospheric pressure for a time effective to increase the intrinsic viscosity of the starting material to at least about 0.5. During the reaction, additional water is produced as a byproduct and is removed overhead along with the excess diol.

In order to impart to the polyester maximum resistance to acrolein generation, the hindered phenolic acid or ester is added to the polymerization reaction mixture in the pressure step of the melt polymerization process. Alternatively, the hindered phenolic acid/ester can be added in the vacuum step or to the polymer melt prior to solid-stating, but addition under high vacuum conditions can result in a lower degree of modification of the polyester, particularly with the lower alkyl hindered phenolic esters.

The hindered phenolic acid/ester is attached to the polymer chain via (trans)esterification. The byproduct water (from the acid) or alkyl alcohol (from the ester) can be easily distilled off when the byproduct boils at a temperature less than the boiling point of 1,3-propanediol under the reaction conditions. Residual monofunctional alcohol in the polymerization product mixture can terminate the polymer chain, reducing the ultimate polymer molecular weight. For this reason hindered phenolic acids or the lower alkyl esters (such as methyl, ethyl, propyl, hexyl) are most preferred because of the relatively easy removal of byproduct water or alcohol from the polymerization reaction mixture.

The molten product of the first stage is cooled, solidified and optionally formed into pellets. The polymer is then polycondensed in solid form ("solid-stated") at an elevated temperature less than the target polymer melting point, generally (for polytrimethylene terephthalate) at a temperature greater than about 180° C., preferably above about 200° C., under reduced pressure and/or an inert gas stream. The solid-state polymerization phase is carried out for a time, generally about 4 hours or more, to produce a modified polytrimethylene terephthalate having an i.v. of at least about 0.8, generally within the range of about 0.95 to about 1.15 for fiber applications.

The hindered phenolic acid/ester for preparation of the modified 1,3-propanediol-based polyester is selected from acids and acid esters of the general formula

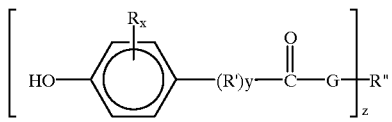

in which R is a $C_{1-12}$ alkyl moiety including methyl, ethyl, isopropyl, t-butyl, t-amyl, 2-phenyl-2-propyl and the like; x is an integer from 1 to 4; at least one R is ortho to the phenolic hydroxyl group; y is an integer from 1 to about 20; R' is —($CH_2$)— or alkyl-substituted methylene; G is oxygen or nitrogen; z is an integer from 1 to about 4; and R" is a direct bond, H or $C_{1-30}$ hydrocarbyl or heterocarbyl, preferably $C_{1-10}$ alkyl such as methyl, ethyl, propyl, hexyl, isodecyl, and the like. Note that the R and R' groups can be joined, as in the structure

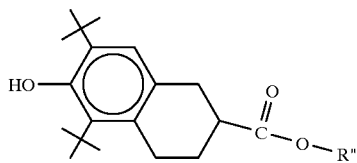

and that the alcohol group (OR") is not limited to low molecular weight monofunctional alcohols but can include higher alcohols such as dodecyl, hexadecyl, octadecyl and the like, and di-, tri- and tetraols such as 1,6-hexanediol, pentaerythritol, and the like. Preferred hindered phenolic esters include octadecyl 3-(3,5-di-t-butyl-4-hydroxyphenyl) propionate, tetrakis(methylene(3-(3,5-di-t-butyl-4-hydroxyphenyl)propionate))methane, 1,6-hexamethylene-bis(3-(3,5-di-t-butyl-4-hydroxyphenyl)propionate), triethyleneglycol bis(3-(3-t-butyl-4-hydroxy-5-methylphenyl)propionate), and 1,3,5-tris(3,5-di-t-butyl-4-hydroxybenzyl)-1,3,4-triazine-2,4,6(1H,3H,5H)-trione available commercially as Irganox 1076, Irganox 1010, Irganox 259, Irganox 245 and Irganox 3114, respectively.

Related hindered phenolic amides and nitrogen-containing esters such as 1,2-bis(3-(3,5-di-t-butyl-4-hydroxyphenyl) propionyl)hydrazine (Irganox 1024) and N,N'-hexamethylene bis-(3-(3,5-di-t-butyl-4-hydroxyphenyl)propionamide) (Irganox 1098) can be used to form the end-capped polyester of the invention, but such compounds are not preferred because they tend to impart higher color to the polymer.

Because the polyester preparation process includes at least one vacuum step, it is preferred that the hindered phenolic acid corresponding to any selected hindered phenolic ester have a boiling point higher than that of 1,3-propanediol, which will help prevent removal of the acid from the reaction mixture under vacuum. The most preferred hindered phenolic esters are thus those in which the corresponding acid has a boiling point greater than that of 1,3-propanediol under the polymerization reaction conditions, preferably within the range of about 240° C. to about 300° C., and the (trans)esterification byproduct (water or lower alkyl alcohol) has a boiling point lower than 1,3-propanediol.

A most preferred class of hindered phenolic acid/esters is as defined by the formula above in which at least one R group ortho to the phenolic hydroxyl is t-butyl, t-amyl or 2-phenyl-2-propyl; x is 1 or 2; G is oxygen; y is 1 or 2; R' is —($CH_2$)— or alkyl-substituted methylene; z is 1; and R" is H or $C_{1-8}$ alkyl. The use of acids, such as in 3-(3,5-di-t-butyl-4-hydroxyphenyl)propionic acid, has the advantage of producing water as a byproduct. The alcohol byproduct of an ester reaction introduces an additional chain terminator into the polymerization reaction mixture. A further advantage of an acid is its greater solubility in 1,3-propanediol.

The amount of hindered phenolic acid/ester will generally be such that the molar ratio of the hindered phenolic acid/ester to aromatic diacid (or ester) monomer present in the polymerization reaction mixture is from about 0.0005 mmole per mole of diacid to about 5 mmole/mole, preferably from about 0.005 to about 0.5 mmole/mole. Additional hindered phenolic acid/ester can be used but is not preferred because of limiting effects on final polyester molecular weight.

Although modification of polytrimethylene terephthalate with certain hindered phenolic acid/esters can increase polymer color or reduce polymer molecular weight, the hindered phenolic acid/esters of the preferred groups cause little or no increase in color particularly when used in combination with an organophosphite. The aromatic organophosphite additive contains a trivalent phosphorus group $(ArO)_wP$ in which the organophosphite contains at least one $C_{6-20}$ aromatic ring bonded to a phosphorus through an oxygen atom and w is an integer from 1 to 3. Examples of preferred organophosphites are tris(2,4-di-t-butylphenyl)phosphite, bis(2,4-di-t-butylphenyl)pentaerythritol diphosphite and 2-[[2,4,8,10-tetrakis (1,1-dimethylethyl)dibenzo[d, f][1,3,2]-dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]ethyl]ethanamine, available commercially as Irgafos 168, Ultranox 626 and Irgafos 12, respectively.

The organophosphite compound, if used, is preferably added in the pressure step of the melt stage of the polymerization process. The phosphorus-containing compound is present in the condensation reaction mixture in an amount within the range of about 0.01 to about 0.5%wt, preferably about 0.05 to about 0.3%wt, based on the combined weight of the diol(s) and the diacid(s). Excess phosphite is undesirable because of possible negative effects on catalyst activity. While incorporation of the organophosphite in the polymerization reaction mixture can result in (trans) esterification reaction with the polyester, any such reaction will not interfere with the beneficial results achievable with the invention composition.

The polymer composition prepared according to the invention process is white or near-white in color. The polymer can be spun into fibers or molded into parts which also exhibit decreased acrolein generation when heated in air.

EXAMPLE 1

Preparation of Modified PTT. A 600 ml stainless steel pressure reactor fitted with a distillation column, condenser and collection vessel was charged with 133.2 g (1.75 mole) of 1,3-propanediol having a total carbonyl content of about 70 ppm (as C=O), 207.7 g (1.25 mole) terephthalic acid, 0.17 g Irgafos 168 (an organophosphite, 0.05 wt %) and 0.04 g 3-(3,5-di-t-butyl-4-hydroxyphenyl)propionic acid (0.013 wt %, 0.144 mmole). The reactor was pressurized to 50–80 psi with nitrogen, with pressure released five times to degas followed by repressurization to 20 psi and heating to 250° C. The pressure was maintained at 50 psi for two hours and then lowered in 10-psi increments each hour thereafter. After a total of about 6 hours, any remaining pressure was released and the aqueous distillate was weighed. The molten product was poured into a pan and cooled.

The product oligomer (140 g) and 0.072 g titanium butoxide (80 ppm based on Ti) were charged to a 500-mL 3-neck flask. The flask was degassed with nitrogen, evacuated to about 200 mbar with a small nitrogen sweep through the reactor, and heated with stirring in an oil bath to 260° C. The pressure was reduced to less than about 2 mbar. After 3 hours, the reaction mixture was cooled and the polymer was isolated.

Intrinsic viscosity (i.v.) of the polymer was measured in hexafluoroisopropanol. The yellowness index (YI) of the polymer was measured on a molded plaque by reflectance in accordance with ASTM D-1925. "Carbonyls" refers to those compounds, whether containing the C=O chemical group or not, converted according to ASTM E 411-70 to 2,4-nitrophenylhydrazone derivatives and measured calorimetrically (basis C=O). Results are shown in Table 1. Acrolein was measured in ppm per weight of polymer.

EXAMPLE 2

Comparison Preparation of Unmodified PTT. The polymerization of Example 1 was repeated, except no organophosphite or hindered phenolic acid was added. Test results are shown in Table 1. The comparison polymer formed substantially more acrolein when heated in air than that of the polymer prepared in Example 1.

A sample of polymer prepared as described in this example was ground at liquid nitrogen temperature, sieved through 20 mesh, and the fine powder was extracted with a 1:1:1 hexane:methanol:chloroform solution. No phenolic ester or acid was detected by reverse phase high pressure liquid chromatography (diode array VV detector at 250 nm).

EXAMPLE 3

Preparation of Modified PTT with Hindered Phenolic Ester. The polymerization of Example 1 was repeated, except that 0.065 g of Irganox 1076 (0.122 mmol) was used instead of the hindered phenolic acid. As shown in Table 1, the acrolein formation in air was similar to that of the polymer of Example 1.

A sample of polymer prepared as described in this example was ground at liquid nitrogen temperature, sieved through 20 mesh, and the fine powder was extracted with a 1:1:1 hexane:methanol:chloroform solution. No phenolic ester or acid was detected by reverse phase high pressure liquid chromatography (diode array UV detector at 250 nm).

EXAMPLE 4

Preparation of Modified PTT with Hindered Phenolic Ester. The polymerization of Example 3 was repeated, except that the organophosphite was omitted and a relatively large amount (8.5 g, 16 mmol) of hindered phenol Irganox 1076 was used. The oligomer and polymer were more colored than those of Example 3, some solids were collected in the aqueous distillate, and the molecular weight of the final polymer was substantially reduced.

A sample of the polymer was ground at liquid nitrogen temperature, sieved through 20 mesh and the fine powder was extracted with a 1:1:1 solution of hexane:methanol:chloroform. No extractable Irganox 1076 was detected by reverse phase high pressure liquid chromatography (diode array UV detector at 280 nm).

A sample of the oligomer produced in the first step of the polymerization was ground and the fine powder extracted with a 1:1:1 solution of hexane:methanol:chloroform. No Iraganox 1076 or parent hindered phenolic acid was detectable in the extract by reverse phase high pressure liquid chromatography (UV detector). Analysis by liquid chromatography combined with mass spectroscopy (LC-MS) showed the presence of species with m/z of 336, 484, 542, 690, 748 and 896 which correspond to polytrimethylene terephthalate oligomers endcapped with the hindered phenolic acid. Similar analysis of a control prepared as in Example 2 without hindered phenolic ester did not exhibit any significant oligomeric species at these molecular weights, as expected.

These results show that essentially all the hindered phenolic ester has undergone transesterification and that the hindered phenolic acid portion is bound to the polymer.

The lower molecular weight of the final polymer obtained with a relatively large amount of the ester is also consistent with the transesterification reaction of the ester, because both the hindered phenolic acid and the $C_{18}$ alcohol derived from the ester are mono-functional species which can terminate the polymer chain and reduce the molecular weight of the polymer.

EXAMPLE 5

Preparation of Modified PTT with Hindered Phenolic Acid. The polymerization of Example 1 was repeated, except that the organophosphite was omitted and a relatively larger amount (0.87 g, 3.1 mmol) of the hindered phenolic propionic acid was used. The polymer molecular weight was somewhat reduced compared to that prepared in Example 2.

A sample of the polymer was ground at liquid nitrogen temperature and sieved through 20 mesh, and the fine powder was extracted in a Soxhlet extractor with acetonitrile for four hours. After evaporation of the acetonitrile solvent, the residue was taken up in a small amount of solvent and analyzed by reverse phase high pressure liquid chromatography (UV detector). By comparison to a standard solution of the hindered phenolic acid, essentially no detectable hindered phenolic acid was detected in the extract. This is consistent with essentially all of the hindered phenolic acid being bonded via the carboxylic acid group to the polymer.

Similarly, extraction of the polymer formed in the first (pressure) step provided oligomers that were analyzed by LC-MS. The mass spectral data was consistent with species containing the hindered phenolic acid bound to the PTT oligomers, e.g. m/z 336, 484, 542, 690, 748, 896.

EXAMPLE 6

Use of Comparative Phenolic Acid. A polymerization was conducted as in Example 1, except that the acid was replaced by 0.03 g 3,5-di-t-butyl-4-hydroxybenzoic acid (0.12 mmol). Surprisingly, the resistance to acrolein generation of the resulting polymer was not improved, suggesting that a methylene group para to the phenolic hydroxyl is required to achieve the desired effect.

TABLE 1

| Example | IV | Yellowness Index | Acrolein in air 6 hr/175° C. | Acrolein in $N_2$ 13 hr/150° C. |
|---|---|---|---|---|
| 1 | 1.16 | 21.1 | 68 | 14 |
| 2 | 1.36 | 29.1 | 408 | 8 |
| 3 | 1.22 | 26.0 | 65 | 8 |
| 4 | 0.55 | 68 | 20 | 15 |
| 5 | 1.06 | 40.2 | 20 | 17 |
| 6 | 1.06 | 17.2 | 432 | 19 |

EXAMPLE 7

Confirmation of Modified PTT Identification. The distillates collected during the vacuum stage from larger-scale runs (15–20 lbs/batch) prepared by the process of Example 1 with 0.025 wt % Irganox 1076 and 0.05% Irgafos 168 were analyzed by gas chromatography/mass spectroscopy and found to contain about 0.06 to 0.13% $C_{18}$ alcohol ($C_{18}H_{37}OH$), which demonstrates that cleavage of the ester bond of Irganox 1076 occurred and that at least a portion of the alcohol group of Irganox 1076 was distilled from the polymerization mixture along with the 1,3-propanediol. Based on the expected amount of 1,3-propanediol removed at this stage, the amount of the $C_{18}$ alcohol observed in the distillate was approximately 25% to about 60% of the total alcohol available, in theory, from the Irganox 1076 used. In addition, LC-MS indicated small but detectable amounts of low molecular weight oligomers in this distillate at 336 to 542 consistent with oligomers containing the hindered phenolic acid endcap.

The distillates were also analyzed for the parent hindered phenolic acid [3-(3,5-di-t-butyl-4-hydroxyphenyl)propionic acid] by high pressure liquid chromatography (reverse phase, UV detector) but less than about 10 ppm of the acid (the estimated detection limit based on a standard solution of the acid) was seen. Therefore, essentially all of the hindered phenolic acid portion of Irganox 1076 remained with the polymer and is consistent with the proposed esterification reaction between the acid and the polyester chain.

These distillates also contained about 0.8 to 1.1% 2,4-di-t-butylphenol, which arises from the Irgafos 168 organophosphite.

Distillates from control polymerizations without added Irganox 1076 contained no detectable $C_{18}$ alcohol and less than 10 ppm (upper limit) of the hindered phenolic acid.

Extractions of this control polymer did not contain detectable hindered phenolic acid/ester or encapped oligomers.

EXAMPLE 8

Comparison of Process Variables. The polymerization of Example 1 was repeated in larger scale equipment (about 15–20 lb. polymer per batch) using Irgafos 168 (24 and 48 ppm P) and Irganox 1076 (0.025 and 0.05 wt %) in a factorial design series of experiments in which the Irganox 1076 was added in the first (pressure) step or in the second (vacuum) step. The polymers were pelletized and advanced to higher molecular weight (i.v. =1 or greater) by solid state polymerization by heating at >200° C. The acrolein generated when the final polymer product was heated in air (6 hours at 175° C.) averaged 56 ppm for the polymers in which the Irganox 1076 was added in the first (pressure) step and 75 ppm for polymers made with the Irganox 1076 added in the second (vacuum) step. Control runs prepared without either Irganox 1076 or Irgafos 168 added to the polymerization produced polymer which generated 190–200 ppm acrolein when heated in air under the same conditions. These results show that addition of the hindered phenolic ester in either step of the polymerization results in reduced generation of acrolein when the polymer is heated in air and that addition in the first (pressure) step is somewhat more effective.

I claim:

1. A 1,3-propanediol-based aromatic polyester composition comprising 1,3-propanediol-based aromatic polyester molecules having at least one terminal group of the formula

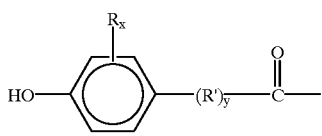

in which each R is selected independently from $C_{1-12}$ alkyl groups and at least one R is ortho to the phenolic hydroxyl group; x is an integer from 1 to 4; R' is —($CH_2$)— or alkyl-substituted methylene; and y is an integer from 1 to about 20.

2. The polyester composition of claim 1 in which at least one R group ortho to the hydroxyl group is selected from the group consisting of t-butyl, t-amyl and 2-phenyl-2-propyl.

3. The polyester composition of claim 1 in which the 1,3-propanediol-based aromatic polyester is described by the chemical formula

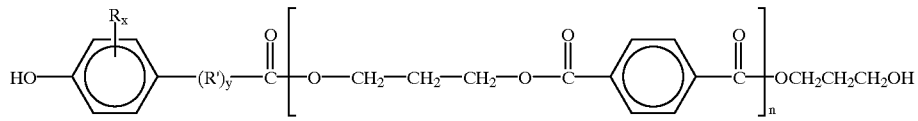

in which n is a number within the range of about 4 to about 2500.

4. The polyester composition of claim 1 which has a yellowness index less than about 25.

5. The polyester composition of claim 1 which has an intrinsic viscosity measured in hexafluoroisopropanol greater than about 0.8.

6. The composition of claim 1 in which the 1,3-propanediol-based aromatic polyester comprises polytrimethylene terephthalate.

7. The polyester composition of claim 3 which comprises molecules described by the formula

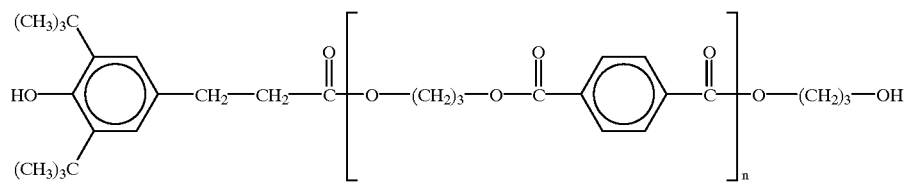

in which n is a number within the range of about 40 to about 250.

8. The polyester composition of claim 1 which is a copolyester derived from terephthalic acid and isophthalic acid.

9. The polyester composition of claim 1 which is a copolyester derived from 1,3-propanediol and bis(3-hydroxypropyl)ether.

10. The polyester composition of claim 1 exhibiting lower acrolein generation when heated in air, compared with a corresponding 1,3-propanediol-based aromatic polyester absent said terminal group.

11. The polyester composition of claim 1 in which the 1,3-propanediol-based aromatic polyester comprises polytrimethylene isophthalate.

12. A 1,3-propanediol-based aromatic polyester composition having a reduced tendency to generate acrolein when heated in air, which composition is a product of a process comprising:

preparing a polymerization reaction mixture comprising 1,3-propanediol, an aromatic diacid or alkyl ester thereof, and a hindered phenolic ester of the formula

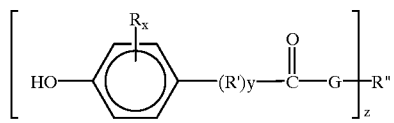

in which each R is selected independently from $C_{1-12}$ alkyl groups; x is an integer from 1 to 4; at least one R is ortho to the phenolic hydroxyl group, R' is —(CH$_2$)— or alkyl-substituted methylene; y is an integer from 1 to about 20; G is oxygen or nitrogen; z is an integer from 1 to about 4; and R" is selected from the group consisting of a direct bond, $C_{1-30}$ hydrocarbyl groups and $C_{1-30}$ heterocarbyl groups;

and maintaining said reaction product mixture at a temperature within the range of about 180 to about 300° C. while removing byproduct water, for a time sufficient to produce a polyester composition of intrinsic viscosity as measured in hexafluoroisopropanol of at least about 0.8.

13. The polyester composition of claim 12 in which the hindered phenolic ester is present in the polymerization reaction mixture in an amount within the range of about 0.0005 to about 5 mmole per mole of the aromatic diacid.

14. The polyester composition of claim 12 in which the hindered phenolic ester is selected from the group consisting of octadecyl 3-(3,5-di-t-butyl-4-hydroxyphenyl)propionate, tetrakis(methylene(3-(3,5-di-t-butyl-4-hydroxyphenyl) propionate))methane, 1,6-hexamethylene bis(3-(3,5-di-t-butyl-4-hydroxyphenyl)propionate), triethyleneglycol bis(3-(3-t-butyl-4-hydroxy-5-methylphenyl)propionate) and 1,3, 5-tris(3,5-di-t-butyl-4-hydroxybenzyl)-1,3,5-triazine-2,4,6 (1H,3H,5H)-trione.

15. The polyester composition of claim 12 in which the 1,3-propanediol-based aromatic polyester is polytrimethylene terephthalate.

16. The polyester composition of claim 12 in which the 1,3-propanediol-based aromatic polyester is polytrimethylene isophthalate.

17. A 1,3-propanediol-based aromatic polyester composition having a reduced tendency to generate acrolein when heated in air, which composition is a product of a process comprising:

preparing a polymerization reaction mixture comprising 1,3-propanediol, an aromatic diacid or alkyl ester thereof, and a hindered phenolic acid of the formula

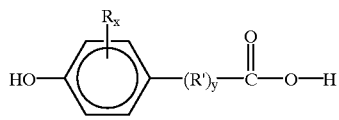

in which each R is selected independently from $C_{1-12}$ alkyl groups; x is an integer from 1 to 4; at least one R is ortho to the phenolic hydroxyl group; R' is —(CH$_2$)— or alkyl-substituted methylene; and y is an integer from 1 to about 20;

and maintaining said reaction product mixture at a temperature within the range of about 180 to about 300° C. while removing byproduct water, for a time sufficient to produce a polyester composition of intrinsic viscosity as measured in hexafluoroisopropanol of at least about 0.8.

18. The polyester composition of claim 17 in which the hindered phenolic acid is present in the polymerization reaction mixture in an amount within the range of about 0.0005 to about 5 mmole per mole of the aromatic diacid.

19. The polyester composition of claim 17 in which the hindered phenolic acid is 3-(3,5-di-t-butyl-4-hydroxyphenyl)propionic acid.

20. The polyester composition of claim 17 in which the 1,3-propanediol-based aromatic polyester is polytrimethylene isophthalate.

21. The polyester composition of claim 17 in which the 1,3-propanediol-based aromatic polyester is polytrimethylene terephthalate.

22. The polyester composition of claim 21 in which the hindered phenolic acid is 3-(3,5-di-t-butyl-4-hydroxyphenyl)propionic acid present in the polymerization reaction mixture in an amount within the range of about 0.005 to about 0.5 mmole per mole of the aromatic diacid.

23. A process for preparing a 1,3-propanediol-based polyester composition which has increased resistance to acrolein generation when heated in air, the process comprising:

preparing a polymerization reaction mixture comprising 1,3-propanediol, an aromatic diacid or alkyl ester thereof, and a hindered phenolic ester of the formula

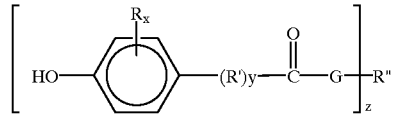

in which each R is selected independently from $C_{1-12}$ alkyl groups; x is an integer from 1 to 4; at least one R is ortho to the phenolic hydroxyl group; R' is —(CH$_2$)— or alkyl-substituted methylene; y is an integer from 1 to about 20; G is oxygen or nitrogen, z is an integer from 1 to about 4; and R" is selected from the group consisting of a direct bond, $C_{1-30}$ hydrocarbyl groups and $C_{1-30}$ heterocarbyl groups, and maintaining said reaction mixture at a temperature within the range of about 180 to about 300° C. while removing byproduct water, for a time sufficient to produce a polyester composition of intrinsic viscosity as measured in hexafluoroisopropanol of at least about 0.8.

24. The process of claim 23 which comprises the steps of:

(a) maintaining said polymerization reaction mixture at a temperature within the range of about 230 to about 300° C. under greater than atmospheric pressure for a time sufficient to produce an intermediate reaction product mixture comprising a 1,3-propanediol-based polyester having an intrinsic viscosity within the range of about 0.05 to about 0.25;

(b) adding a condensation polymerization catalyst to said intermediate reaction product mixture and maintaining the catalyst-containing intermediate reaction product mixture at a temperature within the range of about 240 to about 300° C. under less than atmospheric pressure for a time sufficient to produce a 1,3-propanediol-based polyester having an intrinsic viscosity of at least about 0.5; and (c) heating said polyester in the solid state at a temperature greater than about 180° C. for a time sufficient to produce a polyester composition having an intrinsic viscosity of at least about 0.8.

25. The process of claim 24 in which the condensation polymerization catalyst is selected from the group consisting of titanium and tin compounds.

26. The process of claim 24 in which the condensation polymerization catalyst is titanium butoxide.

27. The process of claim 24 in which the aromatic diacid is selected from the group consisting of terephthalic acid, isophthalic acid, 2,6-naphthalic acid, and mixtures thereof.

28. The process of claim 24 in which the hindered phenolic ester is selected from the group consisting of octadecyl 3-(3,5-di-t-butyl-4-hydroxyphenyl)propionate, tetrakis(methylene(3-(3,5-di-t-butyl-4-hydroxyphenyl)propionate))methane, 1,6-hexamethylene bis-(3-(3,5-di-t-butyl-4-hydroxyphenyl)propionate), triethyleneglycol bis(3-(3-t-butyl-4-hydroxy-5-methylphenyl)propionate) and 1,3,5-tris(3,5-di-t-butyl-4-hydroxybenzyl)-1,3,5-triazine-2,4,6 (1H,3H,5H)-trione.

29. The process of claim 24 in which the hindered phenolic ester is present in the polymerization reaction mixture in an amount within the range of about 0.005 to about 0.5 mmole per mole of the diacid.

30. The process of claim 24 in which step (c) is carried out for a time sufficient to produce a polyester composition having an intrinsic viscosity within the range of about 0.95 to about 1.15.

31. A process for preparing a 1,3-propanediol-based polyester composition which has increased resistance to acrolein generation when heated in air, the process comprising:

preparing a polymerization reaction mixture comprising 1,3-propanediol, an aromatic diacid or alkyl ester thereof, and a hindered phenolic acid of the formula

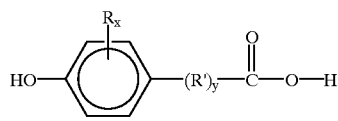

in which each R is selected independently from $C_{1-12}$ alkyl groups; x is an integer from 1 to 4; at least one R is ortho to the phenolic hydroxyl group; R' is —(CH$_2$)— or alkyl-substituted methylene; and y is an integer from 1 to about 20;

and maintaining said reaction mixture at a temperature within the range of about 180 to about 300° C. while removing byproduct water, for a time sufficient to produce a polyester composition of intrinsic viscosity as measured in hexafluoroisopropanol of at least about 0.8.

32. The process of claim 31 which comprises the steps of:

(a) maintaining said reaction mixture at a temperature within the range of about 230 to about 300° C. under greater than atmospheric pressure for a time sufficient to produce an intermediate reaction product mixture comprising a 1,3-propanediol-based polyester having an intrinsic viscosity within the range of about 0.05 to about 0.25;

(b) adding a condensation polymerization catalyst to said intermediate reaction product mixture and maintaining the catalyst-containing intermediate reaction product mixture at a temperature within the range of about 240 to about 300° C. under less than atmospheric pressure for a time sufficient to produce a 1,3-propanediol-based polyester having an intrinsic viscosity of at least about 0.5; and (c) heating said polyester in the solid state at a temperature greater than about 180° C. for a time sufficient to produce a polyester composition having an intrinsic viscosity of at least about 0.8.

33. The process of claim 32 in which the condensation polymerization catalyst is selected from the group consisting of titanium and tin compounds.

34. The process of claim 32 in which the condensation polymerization catalyst is titanium butoxide.

35. The process of claim 32 in which the hindered phenolic acid is 3-(3,5-di-t-butyl-4-hydroxyphenyl)propionic acid present in the polymerization reaction mixture in an amount within the range of about 0.005 to about 0.5 mmole per mole of the aromatic diacid.

36. The process of claim 32 in which the aromatic diacid is selected from the group consisting of terephthalic acid, isophthalic acid, 2,6-naphthalene dicarboxylic acid and mixtures thereof.

37. The process of claim 32 in which step (c) is carried out for a time sufficient to produce a polyester composition having an intrinsic viscosity within the range of about 0.95 to about 1.15.

38. A fiber prepared from the polyester composition of claim 1.

39. A fiber prepared from the polyester composition of claim 12.

40. A fiber prepared from the polyester composition of claim 17.

41. A molded article prepared from the polyester composition of claim 1.

42. A molded article prepared from the polyester composition of claim 12.

43. A molded article prepared from the polyester composition of claim 17.

* * * * *